United States Patent [19]

Worsfold

[11] 4,160,277

[45] Jul. 3, 1979

[54] TELEVISION PICTURE ENHANCEMENT CIRCUIT

[75] Inventor: Peter Worsfold, Northolt, England

[73] Assignee: Evershed-Power Optics Limited, Chertsey, England

[21] Appl. No.: 826,086

[22] Filed: Aug. 19, 1977

[30] Foreign Application Priority Data

Aug. 19, 1976 [GB] United Kingdom ............... 34637/76

[51] Int. Cl.² ............................................. H04N 5/14
[52] U.S. Cl. ................................... 358/166; 358/219; 358/228
[58] Field of Search ................ 358/166, 228, 160, 219

[56] References Cited

U.S. PATENT DOCUMENTS 4,050,085  9/1977  Prince et al. .......................... 358/228

Primary Examiner—Richard Murray
Attorney, Agent, or Firm—Sughrue, Rothwell, Mion, Zinn and Macpeak

[57] ABSTRACT

In apparatus for generating a signal suitable for application to a television receiver, signals corresponding to highlights in the output of a television camera are detected and removed or replaced by signals having a value less than a threshold value, the signal thus modified being used to control an iris or equivalent means for controlling the response of the television camera to a given light input.

5 Claims, 2 Drawing Figures

TELEVISION PICTURE ENHANCEMENT CIRCUIT

BACKGROUND OF THE INVENTION

The dynamic response range of a television camera tube is limited and above this range the camera tube overloads. This causes a problem when the tube is used to view a scene, the brightness of at least a part of which is above the maximum value of the dynamic range. This overloading can be compared to the response of the human eye. When a part of a scene which is being viewed is very bright, the iris contracts, thereby reducing the total amount of light reaching the retina. Unfortunately, this has the effect of darkening the image of the less bright parts of the scene, leading to a loss of contrast in these darker parts with a consequent loss of definition. This contraction of the iris may continue until only the highlights are visible and the definition in the darker scenes is lost; if the light from the highlight regions is still excessive, no detail is visible in the highlight regions either.

Television cameras may similarly be provided with an automatically operating iris. Typically, the light content of a scene is sampled from time to time and the average value is determined. This is compared with a stored average value and the camera output is attenuated to bring the actual average value within the pre-set limits of the stored average. The attenuation may be achieved electronically, by altering the target voltage, or mechanically by adjusting the iris setting. The automatic adjustment is, however, not as efficient as that of the human eye, which is in itself inefficient in certain conditions, as described above.

SUMMARY OF THE INVENTION

According to the present invention image-responsive apparatus for generating a signal suitable for application to a television receiver comprises: a television camera for generating an output signal representing the effect of scanning a scene; means for controlling the response of the television camera to a given light input; a signal-attenuating circuit connected between the camera and an output line for attenuating selected signals in response to a control signal applied thereto; a control means responsive to the camera output prior to its application to the signal-attenuating circuit and operative to generate a control signal when the camera output exceeds a predetermined threshold value, the control signal being applied to the signal-attenuating circuit, whereby the signal-attenuating circuit is operative, when the camera output is above the said threshold value, to reduce the signal applied to the output line to a given value below the threshold value, the means for controlling the response of the television camera to a given light input being in turn responsive to the scene-representing signal following the said signal-attenuating circuit.

In this way, highlights are removed from the picture transmitted to a receiver and are replaced by a signal of given value below the threshold value; the means controlling the camera response is controlled by the waveform from which the highlights have been removed, so that the apparatus has a better response to the darker regions of the scene.

In the preferred form of apparatus, the signal attenuating circuit gates the highlights out of the camera output prior to its application to the output line.

Thus, typically a standard waveform for a video signal may comprise 0.3 volts of sync signal to which is added 0.7 volts of video signal giving a total of 1 volt peak to peak. This signal amplitude can vary by 3 dB without degradation of the monitor display. In the preferred apparatus, in response to such a signal, a variable preset level detection circuit detects signals having a value above this level and squares their leading and trailing edges to produce gating pulses. These gating pulses are then used to remove the portions of the original video waveform which rose above the threshold level of the detector circuit. The signal amplitude at which gating signals are produced can be varied to have any value between the sync level and the top of the video waveform. The modified video waveform, i.e., that which results after the highlights have been gated out as described above, is then applied to a circuit which derives a mean value to control the iris servo control unit; alternatively, for example, the target value of a vidicon tube may be controlled or the AGC of the camera. The resulting receiver picture will have its darker areas enhanced, the areas corresponding to the removed parts of the signal appearing as areas of "flat" intensity.

BRIEF DESCRIPTION OF THE DRAWINGS

In order that the invention may be better understood, an example of a circuit for carrying the invention into effect will now be described with reference to FIGS. 1 and 2 of the accompanying drawings in which.

DETAILED DESCRIPTION OF THE PREFERRED EMBODIMENT

Figure 1:
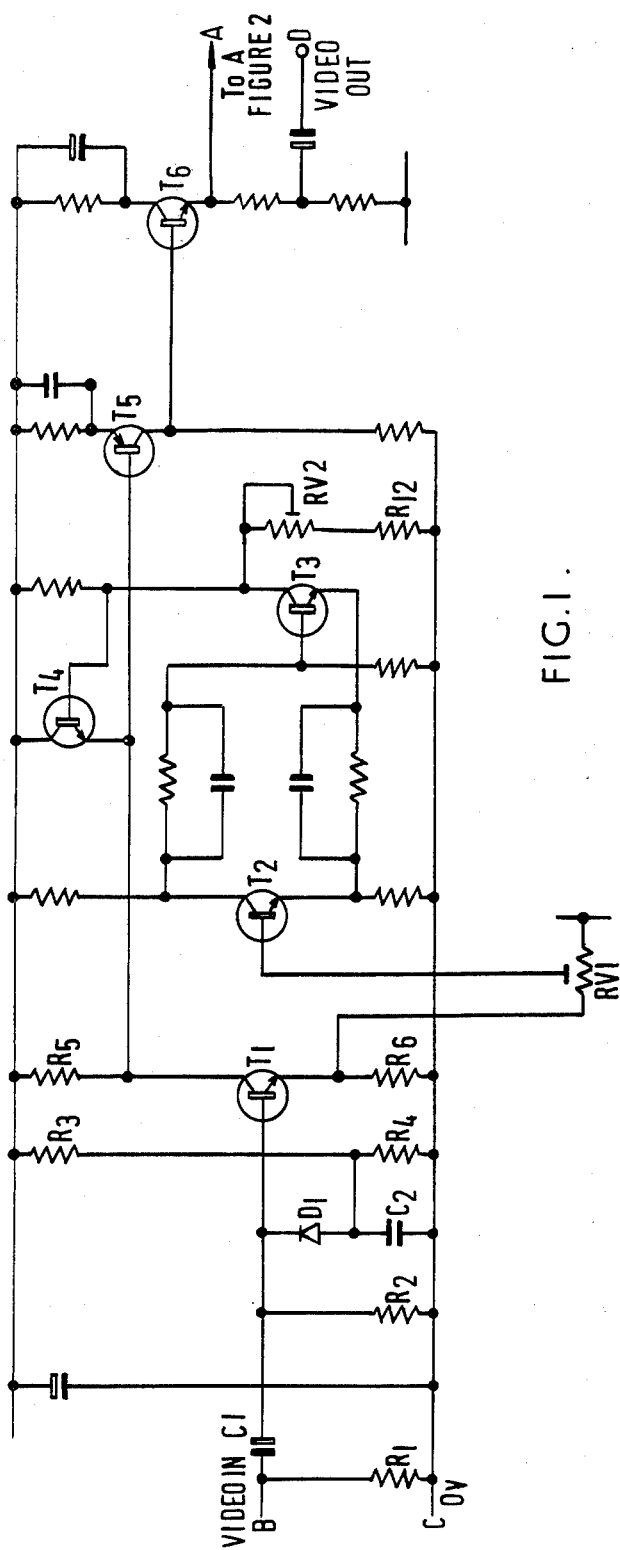
FIG. 1 illustrates the video highlight gating circuit.

In FIG. 1, the video input signal is fed into the circuit by way of terminals B and C across a terminating resistor R1 of 82 ohms. The signal is AC coupled by way of capacitor C1 to a DC restoration circuit comprising resistor R2, diode D1, capacitor C2 and resistors R3 and R4. The video signal is applied by way of this DC restoration circuit directly to the base of transistor T1, the resistors R2 and R3 providing a fixed DC restoration bias. Transistor T1 is a unity gain phase splitter having equal resistors R5 and R6 and providing a positive signal of unity gain at its emitter and a negative signal of unity gain at its collector. The emitter of transistor T1 feeds a potential divider RV1 whose wiper feeds a fast Schmidt amplifier comprising transistors T2 and T3. The Schmidt amplifier produces pulses of square wave form, i.e. with fast edges, the width of the pulses depending upon the extent of the detected highlight, for which the threshold value is selected by means of potentiometer RV1. As an example, the potentiometer adjustment may provide for a minimum highlight level of 0.2 volts of video signal and a maximum of 2 volts.

At the collector of transistor T3 there is obtained a gating signal in the form of positive pulses which are fed directly to the base of transistor T4. The collector and emitter of transistor T4 are connected across the collector load R5 of transistor T1. A potentiometer RV2 is connected in series with a resistor R12 between the collector of transistor T3 and the zero volt line and adjustment of potentiometer RV2 moves the DC level of the gating waveform up or down.

When the gate is active, the negative video signal at the collector of transistor T1 sits at a fixed DC level. By adjusting RV2, the threshold level for the gate can be adjusted between white and black.

The gated output of transistor T1 is fed to a two-stage amplifier comprising transistors T5 and T6. The first stage of this amplifier adds some high frequency lift and returns the signals to the correct polarity to drive the second stage, which is an output buffer to feed a coaxial line of 75 ohms characteristics impedance by way of output terminal D.

Figure 2:
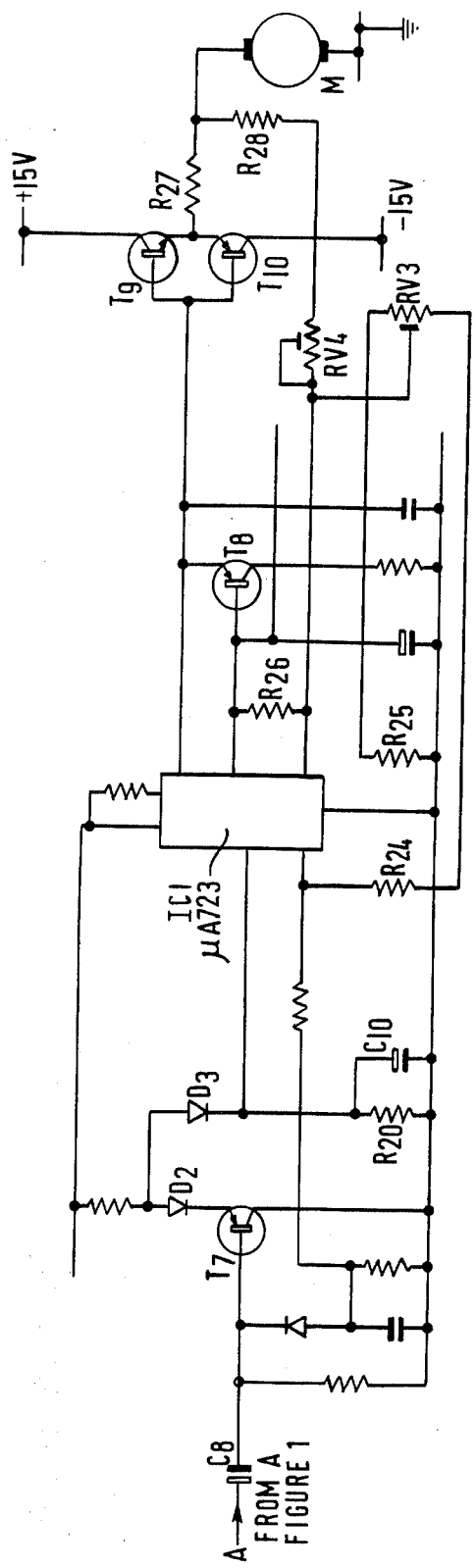
FIG. 2 shows the iris control circuit.

Point A in FIG. 1, is connected to point A in FIG. 2 and conveys the gated video signal at the emitter of transistor T6 (FIG. 1) to the iris control circuit. The signal is fed to the positive side of a capacitor C8 and through this capacitor by way of a DC restoration circuit to the base of a transistor T7. Transistor T7 is connected in an emitter follower circuit feeding a pump diode D2 and a DC rectifying circuit comprising diode D3, resistor R20 and capacitor C10. From the rectifying circuit the signal is applied to the non-inverting input of an amplifier IC1 of the µA723 type. The voltage at this non-inverting input changes with respect to changes in the amplitude of the video signal. At the output of amplifier IC1 there is produced a voltage which is applied by way of transistor T8 to the emitter-follower driver stage comprising transistors T9 and T10. This stage drives the iris servo motor M in a direction such as to produce a change in the level of the new signal to balance the system.

The potential divider comprising resistor R24, potentiometer RV3, resistor R25 and resistor R26, is used to generate an offset for initially balancing the system to permit the iris motor to settle at an optimum position.

The motor output is sampled at the junction of resistors R27 and R28. Negative feedback proportional to the output is applied by way of potentiometer RV4 which acts as a hunting control to stabilise the loop gain of the amplifier.

Such a circuit is particularly effective with cameras of the silicon diode type.

The effect of the circuit is to reduce all highlights above the preset threshold level to a constant level below the threshold. Thus, when the camera is used to view a scene containing a bright lamp in the absence of the circuit embodying the invention, the iris control motor adjusts the iris in such a manner that the remainder of the reproduced scene is very dark and most of the detail is lost. When a circuit embodying the invention is used, the lamp is blacked out but a flare shows around the lamp, where the light intensity is not quite up to the threshold value; this flare is useful in that it marks out the shape of the object blacked out. The removal from the signal applied to the iris control circuit of the intense highlight represented by the lamp reduces the average signal level to such an extent that the iris adjustment is such that a considerable amount of the detail is restored.

Although, as indicated above, the invention is particularly effective when used with silicon diode cameras, it can also be used with advantage with other types of camera. Furthermore, it can be used with black-and-white or colour cameras; in the case of colour cameras, highlights can be reduced to a predetermined colour or to a predetermined grey level.

I claim:

1. An image-responsive apparatus for generating a signal suitable for application to a television receiver to enhance the video picture thereof, comprising:
    (a) a television camera for generating an output signal representative of a scanned scene,
    (b) means for controlling the response of the camera to input light reflected from the scene,
    (c) a signal attenuating circuit connected in series between the camera and a video output line for attenuating selected portions of a video signal in response to a control signal applied thereto,
    (d) control means for generating a control signal when the camera output signal exceeds a predetermined threshold value,
    (e) means coupling the camera output signal to an input of the control means prior to the application of the camera output signal to the attenuating circuit,
    (f) means coupling an output signal from the control means to the attenuating circuit, whereby the attenuation circuit reduces the maximum amplitude of the signal applied to the video output line to a given value below the threshold value when the camera output signal is above said threshold value, and
    (g) means coupling the output of the attenuating circuit to the means for controlling the response of the camera.

2. An image-responsive apparatus in accordance with claim 1, wherein the signal attenuating circuit comprises gating means, and wherein the control signal comprises a gating signal, the gating means being operative in response to said gating signal to remove signals above the threshold value from the camera output prior to its application to the video output line.

3. An image-responsive apparatus in accordance with claim 1, wherein the means for controlling the response of the camera includes an iris, and means for adjusting the iris in response to the signal from the attenuating circuit.

4. An image-responsive apparatus in accordance with claim 1, wherein the television camera is of the silicon diode type.

5. An image-responsive apparatus in accordance with claim 1, wherein the means for controlling the response of the camera includes an iris, and means for adjusting the iris in response to the signal from the attenuating circuit.

* * * * *